United States Patent [19]
Kinoshita

[11] 3,848,410
[45] Nov. 19, 1974

[54] HYDRAULIC TORQUE CONVERTER AND POWER SYSTEM INCORPORATING SAME

[75] Inventor: Keijiro Kinoshita, Yokohama, Japan

[73] Assignee: Nissan Motor Company Limited, Yokohama, Japan

[22] Filed: Apr. 24, 1973

[21] Appl. No.: 354,108

[30] Foreign Application Priority Data
Apr. 25, 1972 Japan.............................. 47-41670
May 1, 1972 Japan.............................. 47-43537

[52] U.S. Cl....................... 60/347, 60/361, 60/413, 60/437, 60/486
[51] Int. Cl........................................... F16h 41/00
[58] Field of Search............ 60/330, 335, 341, 347, 60/363, 413, 437, 486

[56] References Cited
UNITED STATES PATENTS
2,280,015  4/1942  Tipton.............................. 60/343 X

*Primary Examiner*—Edgar W. Geoghegan

[57] ABSTRACT

A new hydraulic torque converter is proposed which is capable of producing a single power output from two or more mechanical power inputs, comprising two or more pumps which are respectively driven from separate driving sources, a stator and a turbine which drives an output shaft. The hydraulic torque converter may be incorporated in a hybrid power system which has two or more mechanical power inputs.

11 Claims, 10 Drawing Figures

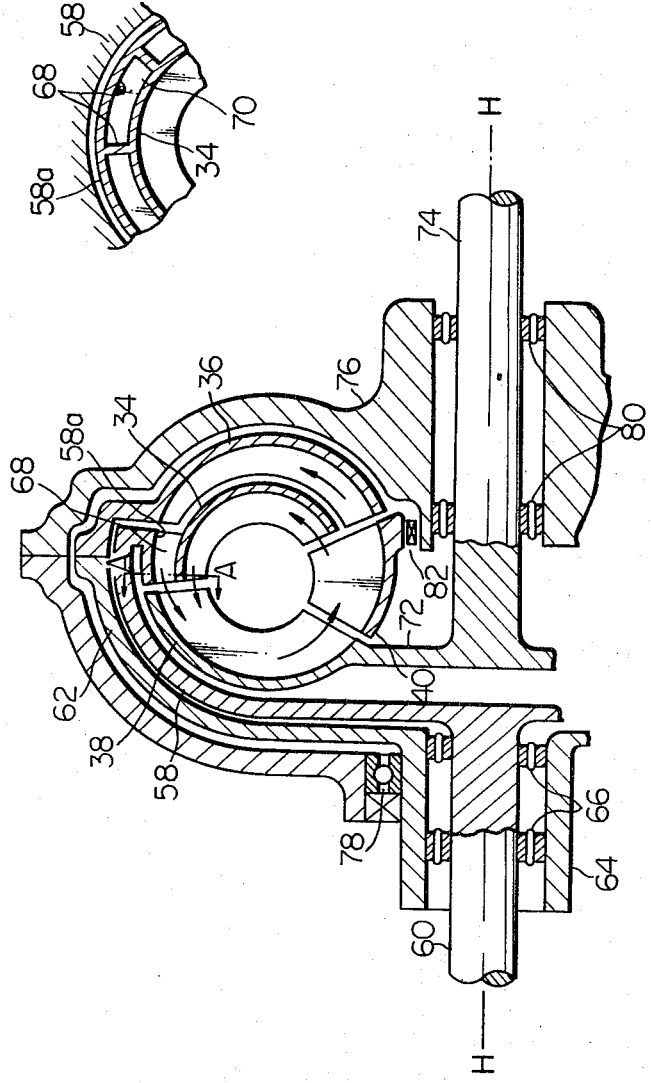

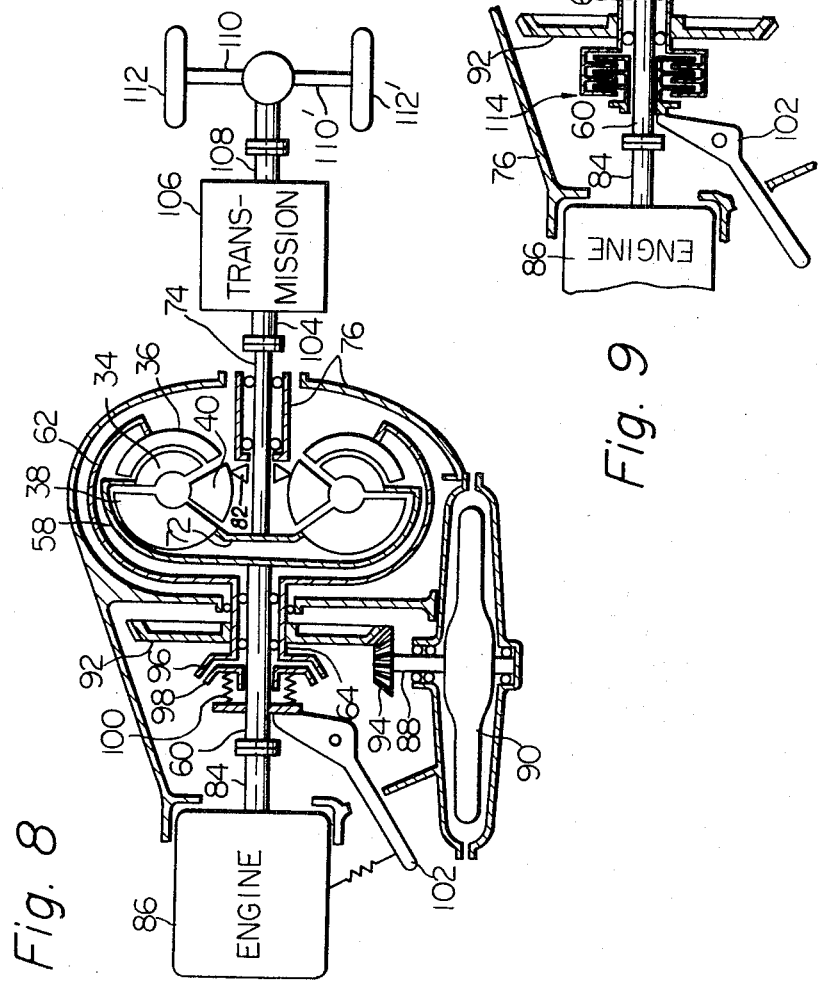

HYDRAULIC TORQUE CONVERTER AND POWER SYSTEM INCORPORATING SAME

The present invention relates to a hydraulic torque converter and, more particularly, to a hydraulic torque converter of the character which is adapted to produce a mechanical power output from two or even more mechanical power inputs. The present invention relates further to a hybrid power system using the torque converter which is driven either simultaneously or selectively from a usual heat engine and a mechanical energy storage means such as a flywheel which is arranged to operate independently of the engine.

For the purpose of obtaining a single mechanical power output from a plurality of power inputs as in an automotive power transmission system, it has been a usual practice to have the two or more power inputs combined in a differential gearing or a planetary gear set and to have the resulting power output transmitted to a hydraulic torque converter for torque multiplication prior to driving a final mechanical driving means such as a propeller shaft of a power transmission system. Excessive noises are generally produced in the gearing mechanism and, moreover, a large overall configuration of the transmission system results from the combination of the gearing mechanism and torque converter. The present invention contemplates elimination of these drawbacks through improvement of the hydraulic torque converter.

It is, therefore, an important object of the present invention to provide a power transmission system which is compatible with two or more mechanical power inputs and which operates sufficiently quietly and has a compact and relatively small overall configuration and can be disposed in a limited working space such as in a motor vehicle.

It is another important object of the invention to provide an improved power transmission system which is capable of producing a single mechanical power output from two or more mechanical power inputs without the aid of a gearing mechanism.

It is, still another important object of the invention to provide a new and useful hydraulic torque converter which can be driven either concurrently or selectively from two or more mechanical power inputs and to deliver a single power output of a modified torque.

Yet, it is another important object of the present invention to provide a hybrid power plant using the hydraulic torque converter which is driven either concurrently or selectively from a plurality of mechanical power inputs such as from a usual heat engine and a flywheel for delivering a single power output resulting from combined power inputs from the driving sources or from a power input from either of the driving sources.

The hydraulic torque converter to accomplish these and other objects of the present invention comprises, as will be more clearly understood as the description proceeds, at least two pumps respectively connected to separate driving members and rotatable about a common axis for producing a combined hydrodynamic force from rotational powers imparted thereto from the driving members, a turbine which is rotatable about the above-mentioned axis responsive to the hydrodynamic power from the pumps and which is connected to a driven member, and a stator positioned between the turbine and at least one of the pumps. The pumps may be located longitudinally adjacent to each other along the above mentioned axis so as to contribute individually to the hydrodynamic power which they produce in the torque converter. Or otherwise, the pumps may be located radially adjacent to each other about the above-mentioned axis so that one pump receives the hydrodynamic power produced by the other and produces a combined hydrodynamic power by adding its own rotational energy to the hydrodynamic power received from the first pump.

The torque converter of the general construction above described may further comprise releasing means for disconnecting at least one of the pumps from its associated driving member so that the turbine is driven by the remaining pump or pumps. The releasing means may comprise a clutch such as a single-disc or multiple-disc clutch or a fluid coupling having valved fluid inlet and outlet port.

Where desired, the torque converter according to the present invention may be incorporated in a hybrid power system using a usual heat engine such as an internal combustion engine and a kinetic energy storage means such as a flywheel. The kinetic energy storage means or flywheel may be connected to one of the pumps of the torque converter through releasable coupling means which may comprise a single-disc or multiple-disc clutch or a fluid coupling having valved fluid inlet and outlet ports as above noted.

Other features and advantages of the hydraulic torque converter and the power system using the torque converter will become apparent from the following detailed description taken in conjunction with the accompanying drawings in which like reference numerals designated corresponding parts in various figures and in which:

FIG. 5 is a sectional view showing a construction of the torque converter which is adapted to achieve the principle of operation analogically illustrated in FIG. 3;

FIG. 6 is a sectional view taken along line A—A of FIG. 5;

FIG. 8 is a schematic sectional view showing a preferred embodiment of the hybrid power system incorporating the hydraulic torque converter having the construction illustrated in FIG. 5;

FIG. 9 is a fragmentary sectional view showing part of a modification of the hybrid power system illustrated in FIG. 8.

Figure 1:
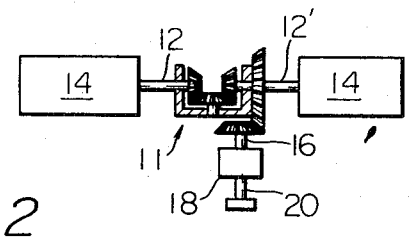
FIG. 1 is a schematic view showing an example of a prior art power transmission system adapted to produce a single power output from two separate power inputs.

Reference will now be made to FIG. 1 for pointing more clearly to the drawbacks of the prior art power transmission delivering a power output from a multiplicity of mechanical power inputs. As schematically illustrated in FIG. 1, the conventional power transmission of the particular character uses a gearing unit 11 having input shafts 12 and 12' which are driven by two independent driving sources 14 and 14', respectively. The gearing unit 11 is herein shown by way of example as being a differential gearing but the same may be a planetary gear set though not so shown. The gearing unit 11 has an output shaft 16 connected to a pump of a hydraulic torque converter 18 having a turbine connected to a driven member 20 which may be a propeller shaft when the power transmission is to be incorporated into a motor vehicle. The driving powers from the two driving sources 14 and 14' are thus combined by means of the gearing unit 11 and the resultant power is transmitted to the driven member or propeller shaft 20 through the torque converter 18. As previously pointed out, excessive noises are produced in the operation of the gearing unit 11 and, moreover, the combination of the gearing unit 11 and the hydraulic torque converter 18 results in a disproportionately large overall configuration of the power transmission system. The present invention therefore aims at elimination of these drawbacks inherent in the prior art power transmission systems of the described character and, to achieve this end, contemplates provision of a new hydraulic torque converter which is adapted to dispense with the gearing unit in delivering a power output from two or more power inputs in a mechanical power transmission system. For the better understanding of the principle of operation of the torque converter herein proposed, analysis may be made into the general principle of operation of a usual hydraulic torque converter with reference to FIG. 2, in which the torque converter is shown by analogy in the form of a hydraulic pumping system.

Figure 2:
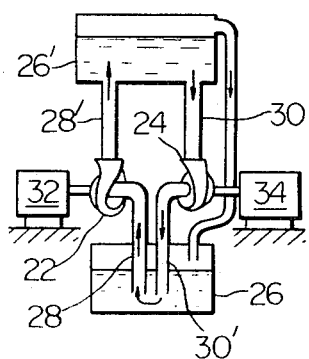
FIG. 2 is a schematic view showing by analogy a principle of operation of a usual hydraulic torque converter.
Figure 3:
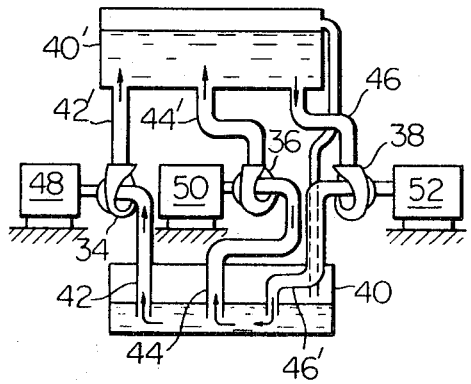
FIG. 3 is a schematic view showing also by analogy a principle operation of a preferred embodiment of the hydraulic torque converter according to the present invention.
Figure 4:
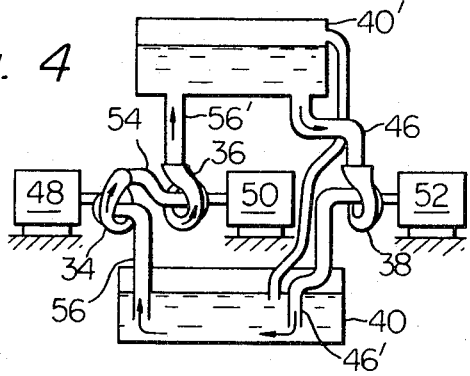
FIG. 4 is a view similar to FIG. 2 but now illustrates a principle of operation of another preferred embodiment of the hydraulic torque converter according to the present invention.

Referring to FIG. 2, the pumping system is schematically illustrated as comprising a pump 22, a turbine 24, and lower and upper fluid tanks 26 and 26', respectively. The combination of the fluid tanks 26 and 26' is assumed to be an analogy of the stator or reaction element of the actual torque converter. The pump 22 has a fluid inlet pipeline 28 leading from the lower fluid tank 26 and a fluid output pipeline 28' terminating in the upper fluid tank 26'. Likewise, the turbine 24 has a fluid inlet pipeline 30 leading from the upper fluid tank 26' and a fluid discharge pipeline 30' terminating in the lower fluid tank 26. The pump 22 is driven from a driving unit 32 which may be an engine of a motor vehicle while the turbine 24 is drivingly connected to a driven unit 34 which may be a unit consisting of a propeller shaft and axles of the motor vehicle. The pump 22 thus sucks in the fluid from the lower fluid tank 26 through the fluid inlet pipeline 28 and delivers the fluid to the upper fluid tank 26' through the fluid outlet pipeline 28' when driven from the driving unit 32. The fluid thus pumped into the upper fluid tank 26' is fed to the turbine 24 through the fluid inlet pipeline 30 by reason of the head possessed by the fluid and thus drives the turbine 24 and accordingly the driven unit 34. The goal of the present invention is to improve a prior art hydraulic torque converter of the above described nature in a manner that the torque converter is compatible with two or more driving sources without aid of any mechanical power transmission means such as a differential gearing or planetary gear set. FIGS. 3 and 4 schematically illustrate also by analogy the principles of operation of the preferred embodiments of the hydraulic torque converter herein proposed to achieve such a goal. In FIGS. 3 and 4, the torque converters according to the present invention are invariably assumed to be in the forms of pumping systems.

Referring first to FIG. 3, the pumping system corresponding to the first preferred embodiment of the hydraulic torque converter according to the present invention comprises first and second pumps 34 and 36, respectively, a turbine 38, and lower and upper fluid tanks 40 and 40', respectively, which are assumed in combination to be in correspondence with the stator of the actual torque converter as previously mentioned. The pumps 34 and 36 may have equal or different capacities and are provided with fluid inlet pipelines 42 and 44, respectively, leading from the lower fluid tank 40 and fluid outlet pipelines 42' and 44', respectively, which terminate in the upper fluid tank 40'. The turbine 38, on the other hand, has a fluid inlet pipeline 46 leading from the upper fluid tank 40' and a fluid discharge pipeline 46' terminating in the lower fluid tank 40. The pumps 34 and 36 are driven by independent driving units 48 and 50, respectively, while the turbine 38 is drivingly connected to a driven unit 52 which is, as previously mentioned, a unit consisting of the propeller shaft and axles of the motor vehicle where the torque converter is to be incorporated in the motor vehicle.

When concurrently driven from the two separate driving units 48 and 50, the pumps 34 and 36 suck in the fluid from the lower fluid tank 40 through the fluid inlet pipelines 42 and 44, respectively, and deliver the fluid to the upper fluid tank 40' through the fluid outlet pipelines 42' and 44'. The fluid thus raised to the upper fluid tank 40' is fed by its head to the turbine 38 through the fluid inlet pipeline 46 and returned to the lower fluid tank 40 through the fluid discharge pipeline 46' whereby the turbine 38 is driven to drive in turn the driven unit 52. The driving powers imparted to the pumps 34 and 36 from the separate driving units 48 and 50, respectively, are in this manner combined together into a common potential energy without use of any mechanical transmission mechanism such as a differential gearing or planetary gear set and the resultant energy is used for the driving of the turbine 38 which is common to both of the pumps 34 and 36.

The pumps 34 and 36 are positioned in parallel with the turbine 38 in the arrangement above described. Where desired, however, the pumps may be positioned in series with the turbine as in an arrangement illustrated in FIG. 4.

Referring to FIG. 4, the pumps 34 and 36 are connected in series with each other through an intermediate fluid pipeline 54 and respectively communicate with the lower and upper fluid tanks 40 and 40' through fluid inlet and outlet pipelines 56 and 56'. The two pumps 34 and 36 are driven from the separate driving units 48 and 50, respectively, and are common to the turbine 38 which is drivingly connected to the driven unit 52 similarly to the arrangement shown in FIG. 3. When concurrently driven from the driving units 48 and 50, the first pump 34 sucks in the fluid from the lower fluid tank 40 through the fluid inlet pipeline 56 and delivers the fluid to the second pump 36 through the intermediate fluid pipeline 54 and the second pump 36 thus receiving the fluid from the first pump 34 passes the fluid to the upper fluid tank 40' through the fluid outlet pipeline 56'. The driving power supplied to the first pump 34 from the associated driving unit 48 is in this manner combined with the driving power supplied to the second pump 36 from the other driving unit 50 when the fluid is delivered from the second pump 36. The turbine 38 consequently receives a hydrodynamic power which results from the driving powers separately applied to the pumps 34 and 36.

Figure 7:
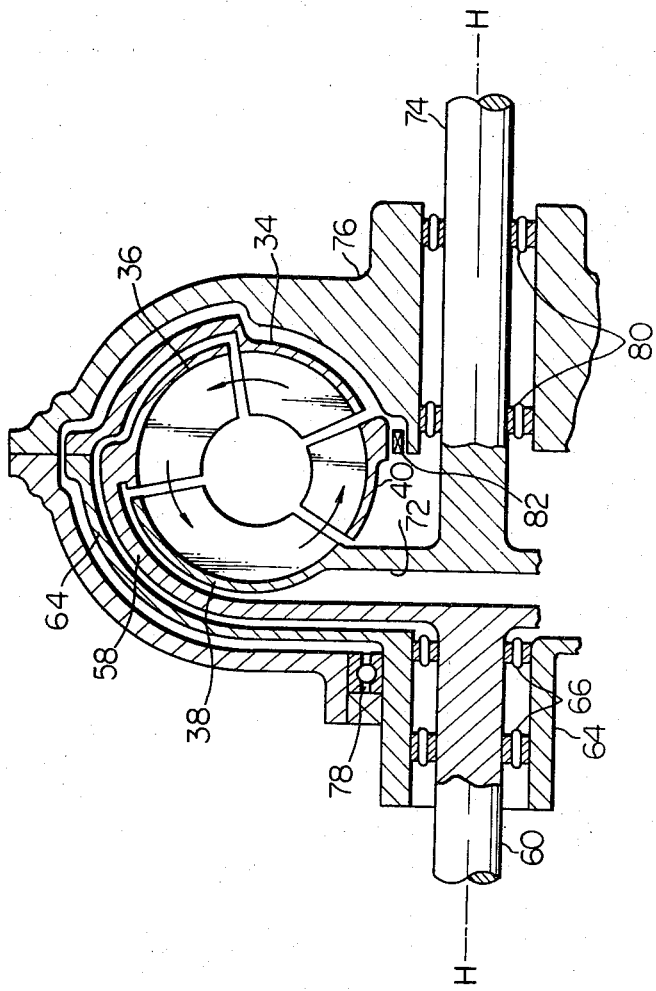
FIG. 7 is a view similar to FIG. 5 but shows a construction of the torque converter which is adapted to realize the principle of operation analogically illustrated in FIG. 4.

A preferred example of the construction of the hydraulic torque converter to achieve the principle of operation of the arrangement shown in FIG. 3 is illustrated in FIGS. 5 and 6, while a preferred example of the construction to achieve the operation principle of the arrangement shown in FIG. 4 is illustrated in FIG. 7.

Referring to FIG. 5, the torque converter comprises first and second pumps 34 and 36, respectively, which are oriented about a common axis H-H and are longitudinally adjacent to each other along the axis H-H. The pumps 34 and 36 have vanes (not shown) as in conventional torque converters and are rotatable independently of each other about the common axis H—H. The pumps 34 and 36 are associated with a turbine 38 and a stator 40 of usual configurations. The pumps 34 and 36, the turbine 38 and the stator 40 are oriented so that their inner surfaces define therein a cavity of a substantially torus shape.

The first or inner pump 34 is connected by a curved arm 58 to a drive shaft 60 which is in line with the axis of the torque converter while the second or outer pump 36 is connected by a curved arm 62 to a hollow drive shaft 64 which is coaxially carried on and rotatable around the shaft 60 by bearings 66. It is, in this instance, important that an appropriate annular spacing be provided between the second or outer pump 36 and the turbine 38. To achieve this end, the first or inner pump 34 is connected to the arm 58 by means of a plurality of struts 68 which extend radially between the outer wall of the inner pump 34 and the arm 58 so as to provide a number of passageways 70 for the fluid to be thrown from the second or outer pump 36 and direct said fluid into the turbine 38 as seen in FIG. 6. The passageways 70 are defined at their radially inner ends by the outer peripheral surface of the inner pump 34 and at their radially outer ends by an annular wall member 58a formed on the curved arm 58 and between the outer circumferential ends of the second or outer pump 36 and the turbine 38 as seen in FIGS. 6 and 7.

The turbine 38, on the other hand, is connected by a curved arm 72 to a turbine shaft 74 which extends in an opposite direction to and in alignment with the drive shafts 60 and 64. The pumps 34 and 36, turbine 38, stator 40, arms 58 and 62 and lengthwise portions of the shafts 60, 64 and 74 are encased within a stationary torque converter housing 76 which contains therein a suitable hydraulic fluid. The hollow drive shaft 64 and the driven shaft 74 are rotatably supported in this torque converter housing 76 through bearings 78 and 80, respectively, while the stator 40 is carried in the housing 76 through a one-way or freewheeling clutch 82 as is customary. The drive shafts 60 and 64 are respectively connected to separate driving sources (not shown) and the driven shaft 74 is connected to any member or unit such as a propeller shaft (not shown) of a motor vehicle which is to be finally driven.

When, in operation, both of the drive shafts 60 and 64 are concurrently driven from their associated driving sources, the two pumps 34 and 36 are rotated about the common axis H—H by the curved arms 58 and 62, respectively, and fluid is accordingly impelled into the turbine 38 simultaneously from the pumps 34 and 36 so that the turbine 38 is driven to rotate with the shaft 74 with a torque resulting from the combined hydrodynamic powers delivered from the individual pumps 34 and 36. Fluid having thus driven the turbine 38 is returned to the two pumps 34 and 36 through the stator 40.

FIG. 7 illustrates a construction of the hydraulic torque converter adapted to achieve the principle of operation illustrated in FIG. 4. The pumps 34 and 36 are thus oriented radially concentric with to each other about a common axis H—H so that the first or radially inner pump 34 has an inlet end adjacent the stator 40 and an outlet end adjacent to an inlet end of the second or radially outer pump 36 which, in turn, has an outlet end adjacent to an inlet end of the turbine 38. The pumps 34 and 36 are connected to the drive shafts 60 and 64 by means of the curved arms 58 and 62, respectively, which are in substantially concentric alignment about the axis H—H of the torque converter, similarly to the construction shown in FIG. 5. Different from the pumps 34 and 36 which are arranged longitudinally adjacent to each other in the configuration illustrated in FIG. 5, the pumps 34 and 36 of the construction shown in FIG. 7 are radially aligned with each other so that, when the two drive shafts 60 and 64 are concurrently driven from their respectively associated driving sources (not shown), the pumps 34 and 36 are rotated about the common axis H—H. Under these conditions, the first or radially inner pump 34 delivers its power output to the second or radially outer pump 36 whereby the power output from the former is combined with the hydrodynamic power produced by the latter. The turbine 38 is driven with a torque resulting from the hydrodynamic powers delivered respectively from the two pumps 34 and 36.

Figure 10:
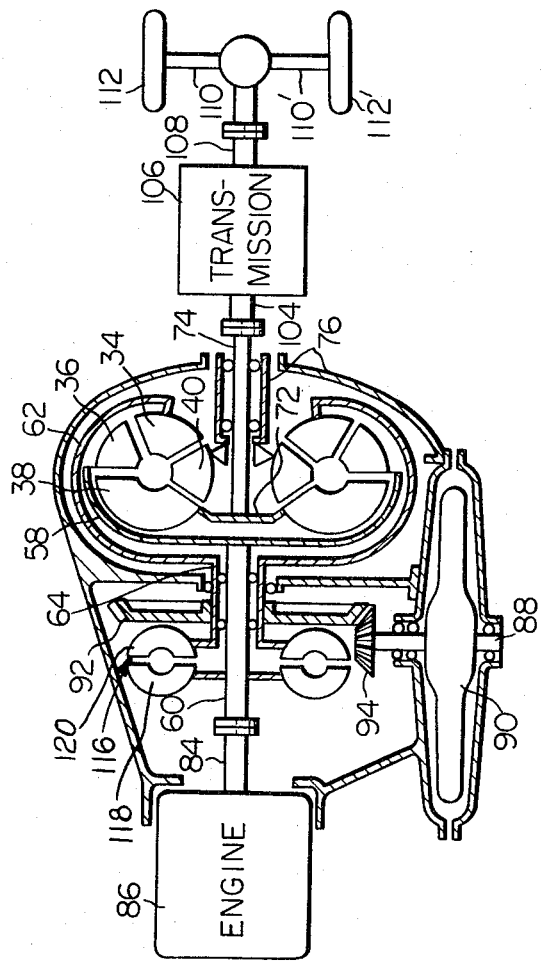
FIG. 10 is a view similar to FIG. 8 but showing a preferred embodiment of the hybrid power system incorporating the hydraulic torque converter of the construction illustrated in FIG. 7.

The hydraulic torque converter of any of the configurations thus far described will find various applications where it is desired that two independent mechanical power inputs be combined into a common power output with a modified torque. FIGS. 8, 9 and 10 illustrate examples of an application of the torque converter in a hybrid power system using a usual heat engine having two separate mechanical power outputs including a flywheel serving as kinetic energy storage means. The hybrid power system of this nature will prove advantageous when incorporated in a motor vehicle.

Referring to FIG. 8, the hydraulic torque converter is herein shown as having the construction illustrated in FIGS. 5 and 6 and thus includes the pumps 34 and 36 which are arranged longitudinally adjacent to each other along the axis H—H. The drive shaft 60 for the first or radially inner pump 34 is connected to an output shaft 84 of a heat engine 86, while the hollow drive shaft 64 for the second or radially outer pump 36 is drivingly connected to an arbor 88 of a flywheel 90 by means of a gearing arrangement which comprises a bevel gear 92 rotatable with the hollow shaft 64 and a pinion 94 meshing with the bevel gear 92 and rotatable with the arbor 88. The hollow drive shaft 64 is rotatable with the drive shaft 60 through a single-disc friction clutch including a clutch disc 96, a pressure plate 98, a pressure spring 100 and a release lever 102 as usual. The pressure plate 98 is constantly rotatable with the drive shaft 60 and engageable with the clutch disc 96 when depressed thereagainst through manipulation of the release lever 102.

Where the above described hybrid power system is to be used in a motor vehicle, the driven shaft 74 connected to the turbine 38 of the torque converter through the arm 72 is connected to an input shaft 104 of a power transmission system which is designated in its entirety by reference numeral 106 and which may include clutch and flywheel means (not shown). The transmission system 106 has an output shaft 108 drivingly connected to axles 110 and 110' for vehicle wheels 112 and 112' as is customary.

When, in operation, the clutch between the drive shafts 60 and 64 is in a coupled condition with its pressure plate 98 in pressing engagement with the clutch disc 96, the driving effort from the heat engine 86 is split into two components one of which is imparted to the first pump 34 through the drive shaft 60 and arm 58 and the other of which is imparted to not only to the second pump 36 through the hollow drive shaft 64 and arm 62 but to the flywheel 90 through the bevel gear 92 and pinion 94. Both of the pumps 34 and 36 are thus concurrently driven from the engine at a common velocity while the kinetic energy transferred to the flywheel 90 is stored at an increasing rate. If, under these conditions, the engine 86 is operating at such a speed as to be unable to drive the pumps 34 and 36 with torques overpowering the load on the turbine 38, the stator 40 will be held stationary by the one-way clutch 82 so as to provide torque multiplication for the transmission 106 as in a conventional torque converter. The stator 40 is released by the one-way clutch 82 so as to be allowed to freewheel, and the torque converter operates as a fluid coupling as in a conventional design. It will be appreciated that if the output shaft 84 ceases to rotate, or the clutch 100 is disengaged while the output shaft 84 continues to rotate, the turbine 38 will continue to be driven by the pump 34 or 36 which continues to rotate. If, on the other hand, the engine 86 is stopped when the clutch is uncoupled, only the second pump 36 will be driven from the flywheel 90 with the first pump 34 held at rest, so that the turbine 38 is driven with a torque resulting from the kinetic energy stored in the flywheel 90. When the enertia energy in the flywheel 90 is reduced to such a level as to be unable to drive the turbine 38 from the second pump 36, then the clutch should be coupled and thereafter the engine started for a second time so that the supply of the rotational power from the engine 86 to the flywheel 90 is re-opened.

As an alternative to the single-disc clutch used in the arrangement shown in FIG. 8, a multiple-disc clutch 114 may be utilized with driving members connected to the shaft 60 and driven members connected to the hollow shaft 64, as illustrated in FIG. 9. Or otherwise, a fluid coupling 116 may be arranged between the shafts 60 and 64 as shown in FIG. 10. The fluid coupling 116 has a pump 118 connected to the drive shaft 60 driven from the engine 86 and a turbine 120 connected to the hollow shaft 64 for the first pump 34. The fluid coupling 116 has valved fluid inlet and outlet ports (not shown) so that the same has a coupled condition when the fluid is directed into the pump 118 and turbine 120 and in an uncoupled condition when the fluid is discharged from the pump and turbine. The charging and discharging of the fluid to an from the fluid coupling 116 may be performed by means of appropriate valves (not shown) which are controlled manually or in an automatic fashion. The hydraulic torque converter incorporated in the power system illustrated in FIG. 10 is assumed to be of the construction shown in FIG. 7 and thus includes the pumps 34 and 36 which are in radially concentrically neighbouring relation to each other around their common axis. The members and units corresponding to those of the arrangement shown in FIG. 8 are designated by like reference numerals in FIG. 10.

I claim:

1. A hydraulic torque converter comprising at least two pumps respectively connected to separate driving members and rotatable about a common axis for producing a combined hydrodynamic power from rotational powers imparted thereto from said driving members, said pumps being located radially adjacent to each other about said axis, the pump positioned radially inwardly of the other being connected through a curved arm and a plurality of struts which are spaced apart from each other around the radially inwardly positioned pump for providing passageways between the other pump and a turbine, the turbine is rotatable about said axis responsive to said hydrodynamic power from said pumps and is drivingly connected to a driven member, and a stator positioned between said turbine and at least one of said pumps.

2. A hydraulic torque converter as claimed in claim 1, in which said pumps are located longitudinally adjacent to each other along said axis.

3. A hydraulic torque converter as claimed in claim 1, further comprising releasing means associated with at least one of said pumps for disconnecting the pump from its associated driving member in a controlled fashion.

4. A hybrid power system comprising first and second driving sources, said first driving source including a heat engine and said second driving source includes mechanical energy storage means which is operative to be driven from said heat engine, and a hydraulic torque converter which comprises first and second pumps connected through first and second driving members to said first and second driving sources, respectively, and rotatable independently of each other about a common axis for producing a combined hydrodynamic power from rotational powers imparted thereto from said driving sources through said driving members, a turbine which is rotatable about said axis responsive to said hydrodynamic power from said pumps and which is drivingly connected to a driven member, and a stator positioned between said turbine and at least one of said pumps.

5. A hybrid power system as claimed in claim 4, further comprising releasable coupling means interconnecting said first and second driving members for driving said energy storage means from said heat engine through said first and second driving members when said coupling means is in a coupled condition and disconnecting said energy storage means from said first driving source when the coupling means is in an uncoupled condition.

6. A hybrid power system as claimed in claim 5, in which said mechanical energy storage means includes at least one flywheel.

7. A hybrid power system as claimed in claim 5, in which said pumps are located radially adjacent to each other.

8. A hybrid power system as claimed in claim 5, in which said pumps are located longitudinally adjacent to each other along said axis.

9. A hybrid power system as claim in claim 5, in which said coupling means comprises a single-disc friction clutch having a driving element connected to said first driving member and a driven element connected to said second driving member.

10. A hybrid power system as claimed in claim 5, in which said coupling means comprises a multiple-disc clutch having driving elements connected to said first driving member and driven elements connected to said second driving member.

11. A hybrid power system as claimed in claim 5, in which said coupling means comprises a fluid coupling having a pump connected to said first driving member and a turbine connected to said second driving member and valved fluid inlet and outlet ports.

* * * * *